(12) United States Patent
Liu et al.

(10) Patent No.: US 11,650,686 B2
(45) Date of Patent: May 16, 2023

(54) UNITARILY WHITE LIGHT-TRANSMITTING DEVICE AND TOUCH DISPLAY

(71) Applicant: EMERGING DISPLAY TECHNOLOGIES CORP., Kaohsiung (TW)

(72) Inventors: Po-Tsun Liu, Kaohsiung (TW); Chi-Chih Chang, Kaohsiung (TW)

(73) Assignee: EMERGING DISPLAY TECHNOLOGIES CORP., Kaohsiung (TW)

( * ) Notice: Subject to any disclaimer, the term of this patent is extended or adjusted under 35 U.S.C. 154(b) by 0 days.

(21) Appl. No.: 17/693,276

(22) Filed: Mar. 11, 2022

(65) Prior Publication Data

US 2022/0300102 A1   Sep. 22, 2022

(30) Foreign Application Priority Data

Mar. 17, 2021 (TW) ................. 110202860

(51) Int. Cl.
| | | |
|---|---|---|
| *G06F 3/041* | (2006.01) | |
| *G02F 1/1333* | (2006.01) | |
| *G02F 1/1335* | (2006.01) | |
| *G02F 1/1334* | (2006.01) | |

(52) U.S. Cl.
CPC .......... *G06F 3/0412* (2013.01); *G02F 1/1334* (2013.01); *G02F 1/13338* (2013.01); *G02F 1/133526* (2013.01)

(58) Field of Classification Search
CPC .. G06F 3/0412; G02F 1/13338; G02F 1/1334; G02F 1/133526
See application file for complete search history.

(56) References Cited

U.S. PATENT DOCUMENTS

| | | | |
|---|---|---|---|
| 10,866,615 B1* | 12/2020 | Ng | ........................ G06F 3/0447 |
| 2007/0008456 A1* | 1/2007 | Lesage | .............. G02F 1/133615 |
| | | | 349/62 |
| 2010/0007806 A1* | 1/2010 | Woodgate | ............ G02B 5/0215 |
| | | | 349/187 |
| 2021/0063783 A1* | 3/2021 | Byoun | .................. G02F 1/1323 |

* cited by examiner

*Primary Examiner* — Peter D McLoone
(74) *Attorney, Agent, or Firm* — Hershkovitz & Associates, PLLC; Abe Hershkovitz

(57) ABSTRACT

A unitarily white touch display comprises: a cover lens, a viewing area, from an upper surface to a lower surface of the cover lens, formed in the middle of the cover lens; a touch module disposed under the cover lens to provide touch functions; a light valve module disposed under the touch module and filled with a polymer dispersed liquid crystal layer; a microstructure optical film disposed under the light valve module, and a second surface of the microstructure optical film composed of a plurality of micro-prisms. When incident light enters the touch display, the incident light is scattered by the polymer liquid crystal module, and part of the incident light is reflected by the microstructure optical film, re-transmitted and scattered through the polymer liquid crystal module, so that a user can observe foggy white at the viewing area of the touch display.

16 Claims, 10 Drawing Sheets

UNITARILY WHITE LIGHT-TRANSMITTING DEVICE AND TOUCH DISPLAY

CROSS REFERENCE TO RELATED APPLICATION(S)

This non-provisional application claims the benefit under 35 U.S.C. § 119(e) to patent application No. 110202860 filed in Taiwan on Mar. 17, 2021, which is hereby incorporated in its entirety by reference into the present application.

BACKGROUND OF THE INVENTION

1. Field of the Invention

The present invention relates to a light-transmitting device and a touch display, especially to a light-transmitting device and a touch display with a unitarily white appearance.

2. Description of the Related Art

Nowadays, on the current market, the touch displays are ever more extensively and widely applied in various fields, for example, mobile phones, tablets, notebook computers, electronic whiteboards, vehicle equipment, etc. The touch display currently used can be roughly divided into a display with a frame and without a frame. For the display with a frame in an off mode or a standby mode, the display screen of the touch display is dark in color. Hence most manufacturers adopt a black or dark frame when designing the touch display, and thereby the color of the frame can be very close to that of the display screen, such that when the touch display is turned off or on standby, the display screen and the frame are in a unitary color.

With or without a frame, when the touch display is installed in home appliances such as refrigerators and microwave ovens having black or dark color appearances, and when the touch display is turned off or on standby, the dark color presented by the appearance of the touch display is likely to be consistent with the appearance color of the home appliances, and visual obtrusiveness is unlikely to be perceived. However, if the appearance color of the home appliance is white or in other light colors, and when the touch display is turned off or on standby, the dark appearance of the touch display can be significantly different from the appearance color of the home appliance, resulting in poor visual concordance. Even if a white color frame is used, the white color frame is still not matched by the dark appearance of the touch display.

SUMMARY OF THE INVENTION

In order to make the display screen of a touch display to present a lighter color appearance on standby or when turned off, the present invention discloses a unitarily white touch display. By adopting a design of a light valve module and a microstructure optical film, the display screen can be white or whitish when it is in a standby mode or a turned-off mode.

In order to achieve the above objective, the present invention provides a unitarily white touch display which includes:
 a cover lens, having an upper surface, a lower surface, and a viewing area formed in the middle of the cover lens;
 a touch module, disposed on the lower surface of the cover lens for providing touch functions;
 a light valve module, disposed under the touch module, including:
  a casing, filled with a polymer dispersed liquid crystal (PDLC) layer which is driven by an electric field to form a scattering mode and a transparent mode;
  a conductive film, disposed inside the casing and configured to be charged to generate the electric field;
 a microstructure optical film, disposed under the light valve module and including a first surface and a second surface opposite to each other, the first surface attached to the light valve module and the second surface composed of a plurality of micro-prisms, wherein, in a cross-sectional view, each micro-prism is in a shape of a triangular micro structure;
 a display module, disposed under the microstructure optical film to provide a display function.

The present invention also provides a unitarily white light-transmitting device which includes:
 a light valve module, including:
  a casing, filled with a polymer dispersed liquid crystal (PDLC) layer which is driven by an electric field to form a scattering mode and a transparent mode;
  a conductive film, disposed inside the casing and configured to be charged to generate the electric field;
 a microstructure optical film disposed under the light valve module and including a first surface and a second surface opposite to each other, the first surface attached to the light valve module and the second surface composed of a plurality of micro-prisms, wherein, in a cross-sectional view, each micro-prism is in a shape of a triangular micro structure.

A light valve module of the present invention is filled with a polymer dispersed liquid crystal (PDLC) layer. When an incident light enters the light valve module, the incident light can be scattered, and a portion of the incident light further penetrates the light valve module towards the microstructure optical film and is reflected back by the microstructure to consequently pass through the light valve module, the touch module, the cover lens and finally enters an user's eyes, thus allowing the user to perceive a foggy white appearance of the display through the viewing area of the cover lens. Accordingly, when the frame of the touch display is white or when the touch display is adopted by a home appliance with a white or lighter color appearance, the appearance color of the screen of the touch display can be consistent with the white frame and the home appliance with the white or lighter color appearance. In this way, visual concordance is enhanced and visual obtrusiveness is much less likely to be perceived.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
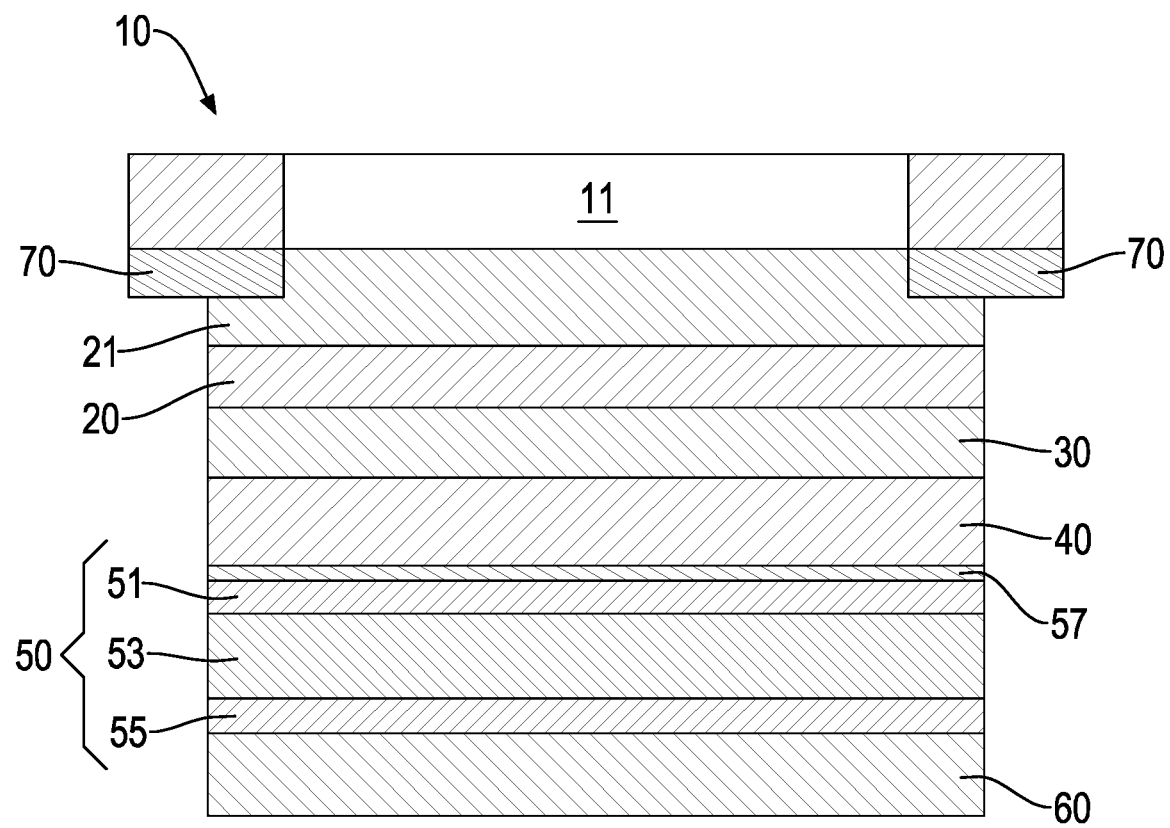
FIG. 1 is a cross-sectional side view of the present invention.
Figure 2:
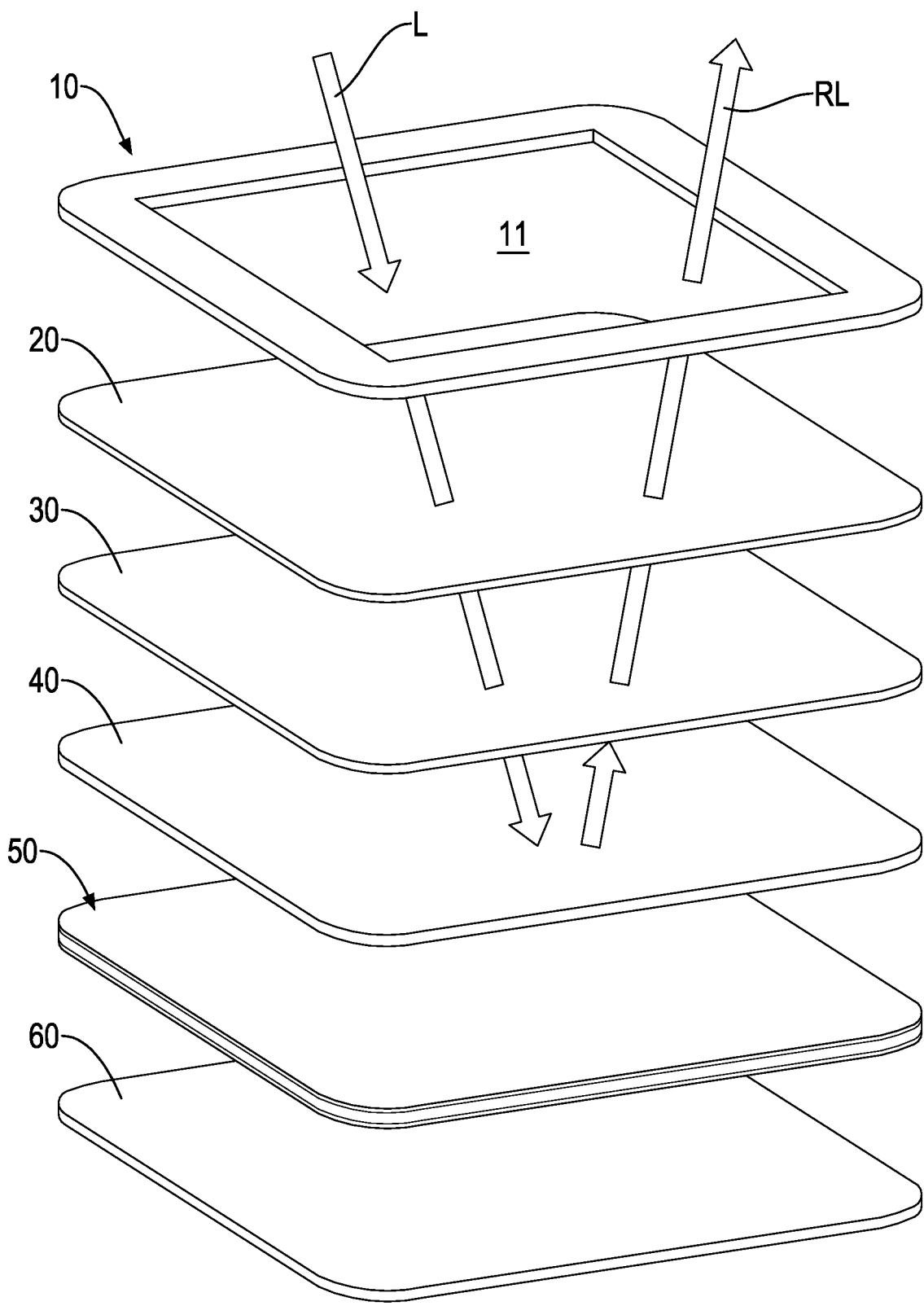
FIG. 2 is an exploded perspective view of the present invention.

Please refer to FIG. 1 and FIG. 2: the present invention discloses a unitarily white touch display, including a cover lens 10, a touch module 20, a light valve module 30, a microstructure optical film 40 and a display module 50.

The cover lens 10 is in the shape of a plate, and includes an upper surface, a lower surface, and a viewing area 11 which is formed in the middle of the cover lens 10.

The touch module 20 is disposed on the lower surface of the cover lens 10, and is attached to the lower surface of the cover lens 10 through an optical adhesive 21, wherein the touch module 20 is transparent. The touch module 20 provides touch functions. Specifically, the touch module 20 may include a plurality of X-axis sensing lines and a plurality of Y-axis sensing lines, and the plurality of X-axis sensing lines and the plurality of Y-axis sensing lines are transparent, and the X-axis sensing lines are configured in parallel with each other, and the Y-axis sensing lines are configured in parallel with each other. The plurality of X-axis sensing lines and the plurality of Y-axis sensing lines respectively intersect. The touch module 20 determines the touch position of a touch object such as a finger or a stylus, by acquiring which X-axis sensing lines and Y-axis sensing lines are triggered by the touch object, and outputs corresponding touch actions accordingly.

Figure 3:
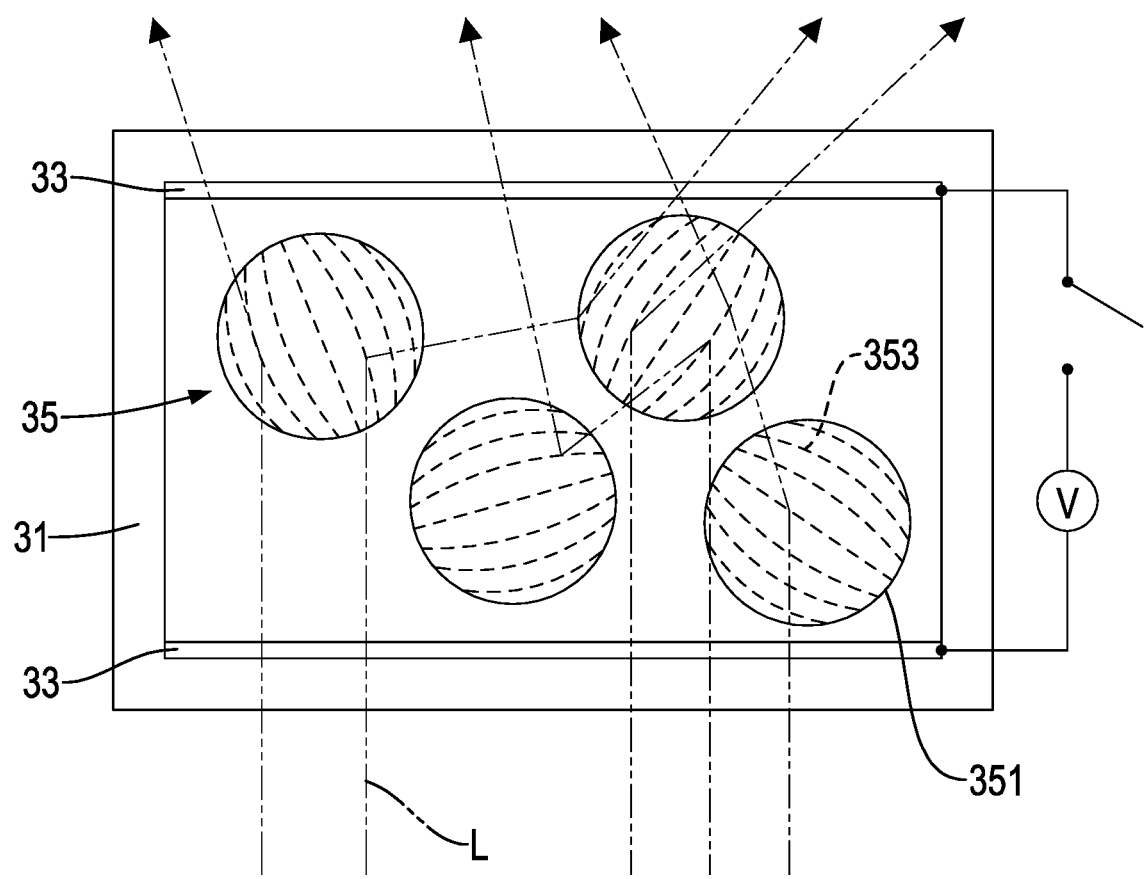
FIG. 3 is a light valve module in a scattering mode of the present invention.

Please further refer to FIG. 3. The light valve module 30 is disposed under the touch module 20. The light valve module 30 includes a casing 31, a conductive film 33 and a polymer dispersed liquid crystal (PDLC) layer 35. The conductive film 33 is disposed inside the casing 31 and can conduct electric charges and get charged to generate an electric field through applying an external voltage from an external power supply V. The polymer dispersed liquid crystal (PDLC) layer 35 is filled in the casing 31. Specifically, the PDLC layer 35 is composed of anisotropic liquid crystal 353 encapsulated by polymer 351. In the light valve module 30, an external voltage is applied to the conductive film 33 to generate an electric field, and the electric field's magnitude and direction are used to further regulate the refractive index relationships between the liquid crystal 353 and the polymer 351, and that results in two different modes, namely, a light scattering mode and a transparent mode, thereby achieving the function of a light valve; wherein, the polymer 351 can be Norland® optical adhesive (NOA65).

Please refer to FIG. 3. When no external voltage is applied, i.e. the PDLC layer 35 of the present invention is turned off or on standby, the polymer 351 and the liquid crystal 353 are randomly aligned as both of them are not affected by the electric field; and the effective refractive index of the liquid crystal 353 does not match the effective refractive index of the polymer 351; thus incident light L entering from the cover lens 10 is blocked and scattered by the liquid crystal 353 and the polymer 351. The PDLC layer 35 thereby enters a scattering mode i.e. an opaque mode or an off mode. In the scattering mode, the reflected surface color of the light valve module 30 is foggy white as the light valve module 30 is been observed.

Figure 4:
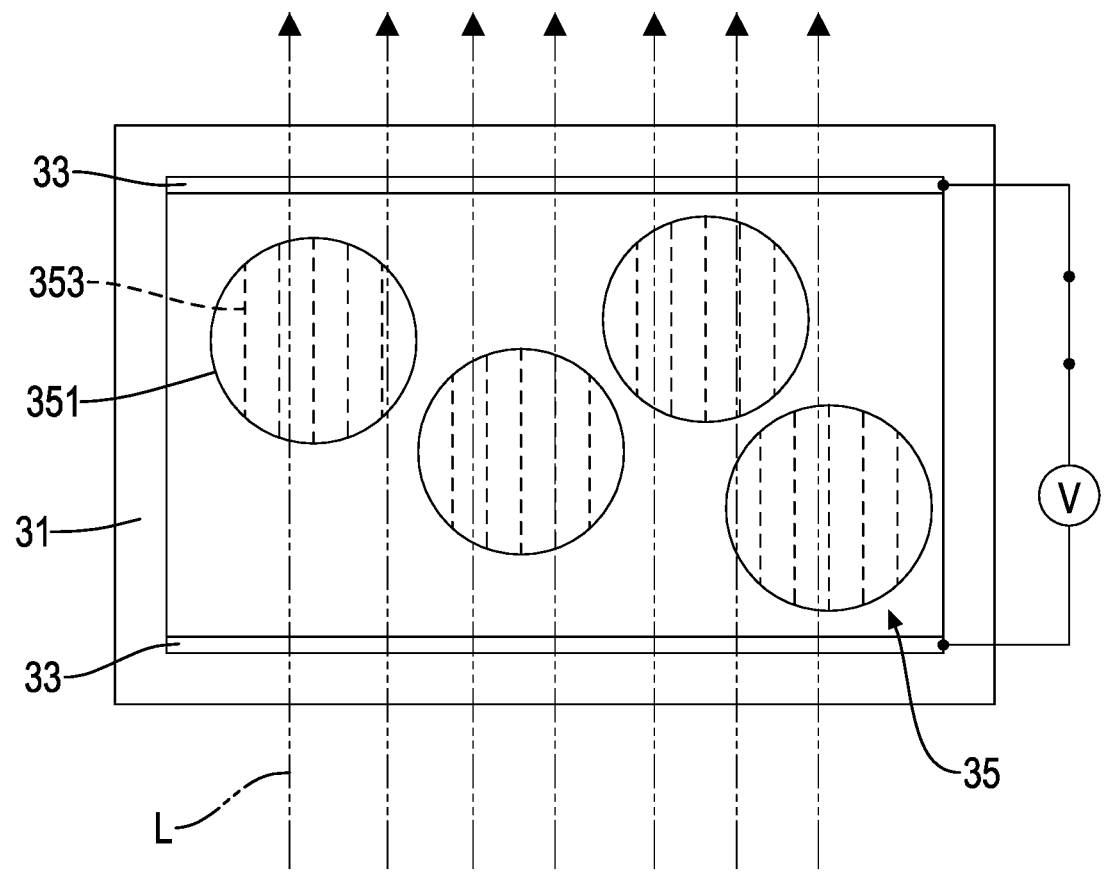
FIG. 4 is a light valve module in a transparent mode of the present invention.

Please refer to FIG. 4. When an external voltage is applied to the conductive film 33, i.e. the PDLC layer 35 of the present invention starts to operate, the polymer 351 and the liquid crystal 353 are driven by an electric field, and the liquid crystal 353 will align vertically. Because the effective refractive index of the liquid crystal 353 is the same as the effective refractive index of the polymer 351 at this moment, the incident light L can pass through the light valve module 30, so that the light valve module 30 enters a transparent mode i.e. an on mode. Generally speaking, the incident light L is ambient natural light, such as sunlight or light from lamps.

Figure 5:
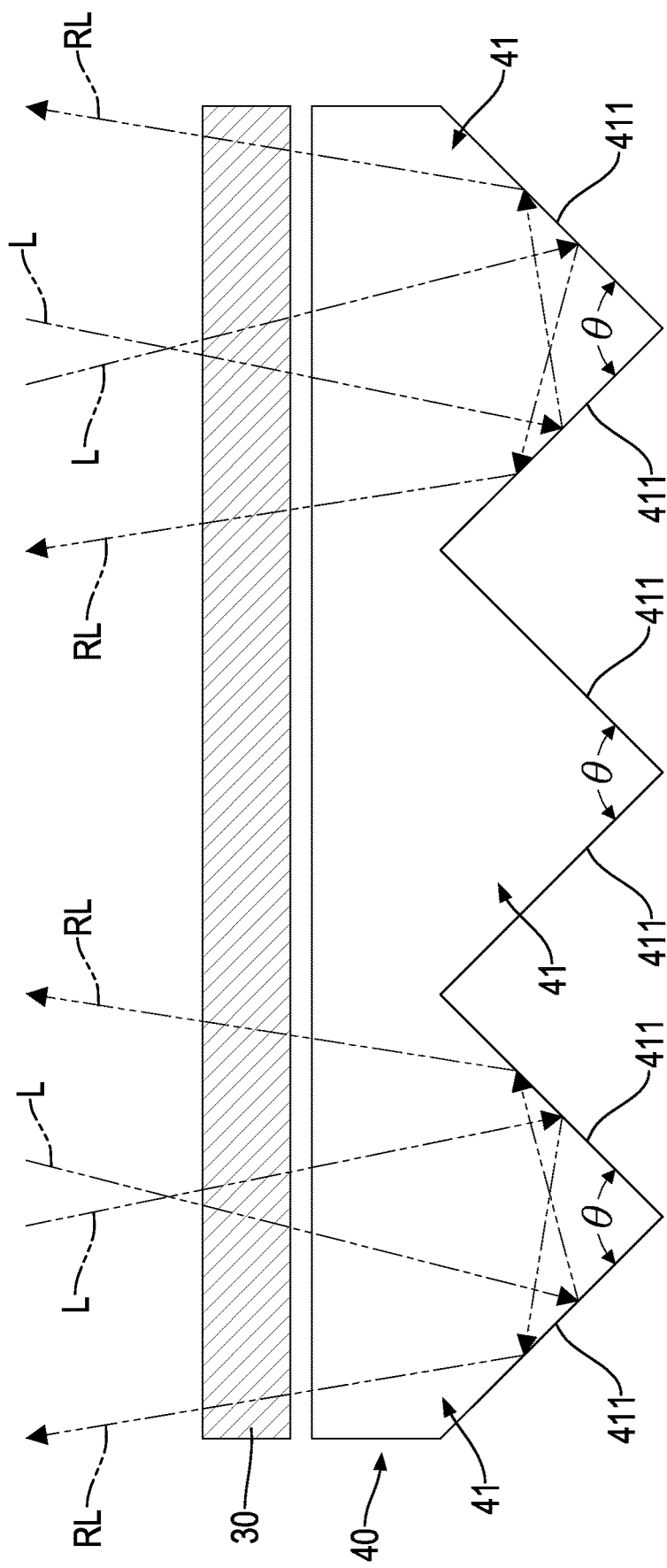
FIG. 5 is a cross-sectional side view of a microstructure optical film of the present invention.

Please refer to FIG. 5 further. The microstructure optical film 40 is disposed under the light valve module 30, and is a collection of semi-transmissive and semi-reflective (i.e. transflective) micro-prisms. The microstructure optical film 40 includes a first surface and a second surface opposite to each other; the first surface is attached to the light valve module 30, and the second surface is composed of a plurality of micro-prisms 41, wherein each micro-prism 41 is a triangular micro structure in a cross-sectional view. The plurality of micro-prisms 41 are configured adjacent to each other on the second surface, and each micro-prism 41 includes two reflecting surfaces 411 joining at an angle θ. The two reflecting surfaces 411 and the second surface of the microstructure optical film 40 together form a triangular micro structure. The angle θ may be 90°.

As FIG. 2 and FIG. 5 show, when an incident light L passes through the light valve module 30 and enters the microstructure optical film 40, the incident light L will be blocked by one of the reflecting surfaces 411 and get reflected to another reflecting surface 411, and finally passes through the light valve module 30 again, and then diffuses away from the cover lens 10. That is to say, the microstructure optical film 40 can re-transmit the incident light L through the light valve module 30 after a secondary reflection, and consequently the user can observe the foggy white in the viewing area 11 of the touch display.

Please refer to FIG. 1. The display module 50 is disposed under the microstructure optical film 40, and is used to provide display functions. Specifically, the display module 50 includes an upper polarizer film 51, a display 53, and a lower polarizer film 55. The upper polarizer film 51 can be attached to the microstructure optical film 40 through another optical adhesive 57. The display 53 is disposed under the upper polarizer film 51, and is sandwiched between the upper polarizer film 51 and the lower polarizer film 55, wherein the upper polarizer film 51 can be a 0-degree polarizer, and the lower polarizer film 55 can be a 90-degree polarizer. In a preferred embodiment, the display module 50 may be a liquid crystal display module, and the display 53 may be a liquid crystal display; alternatively, the display module 50 may be a light-emitting diode display module, and the display 53 may be a light-emitting diode display.

In a preferred embodiment of the display module 50, which is a liquid crystal display module, a backlight module 60 is further included, and the backlight module 60 is disposed under the display module 50 to provide backlight.

As FIG. 3 shows, when the incident light L from the environment enters the touch display of the present invention from the viewing area 11 of the cover lens 10, the incident light L penetrates the transparent touch module 20 to enter the light valve module 30. When there is no electric field applied, the incident light L is blocked and scattered by the liquid crystal 353 and polymer 351 in the light valve module 30, and at that moment, portion of the incident light L penetrating the light valve module 30 is reflected by the microstructure optical film 40 to form a reflected light RL, and the reflected light RL penetrates the light valve module 30, the touch module 20 and the viewing area 11 of the cover lens 10. Hence a user may perceive the viewing area 11 to be white color when the user observes the viewing area 11 of the cover lens 10.

Please refer to FIG. 1. In a preferred embodiment of the present invention, a frame 70 is further included; the frame 70 is disposed between the cover lens 10 and the touch module 20. The frame 70 is coated with white ink, and has a white appearance. Since the frame 70 is white, when the light valve module 30 of the present invention is powered off, the viewing area 11 and the frame 70 both look white, and the user can perceive white appearance of the touch display of the present invention, achieving unitarily white visual effects.

Figure 6:
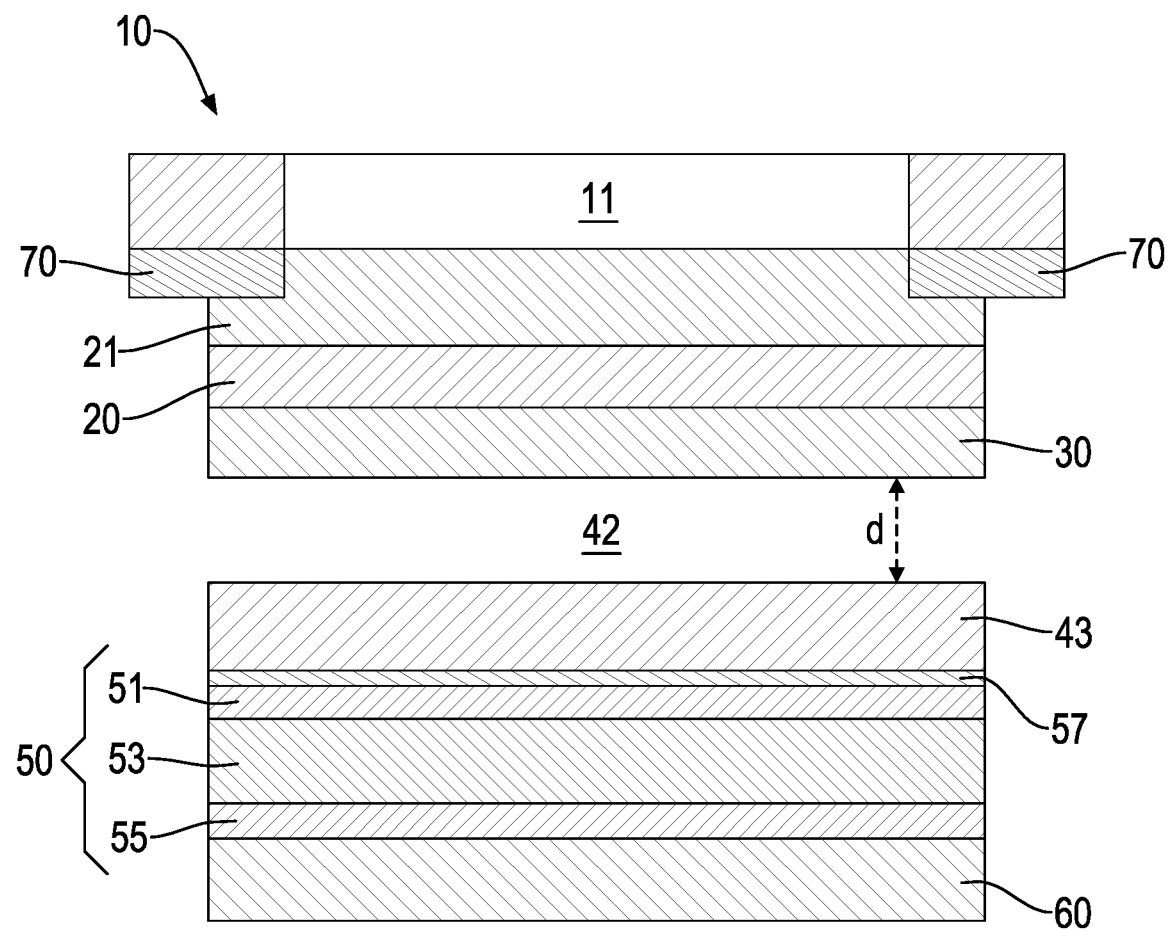
FIG. 6 is a cross-sectional side view of a second embodiment of the present invention.
Figure 7:
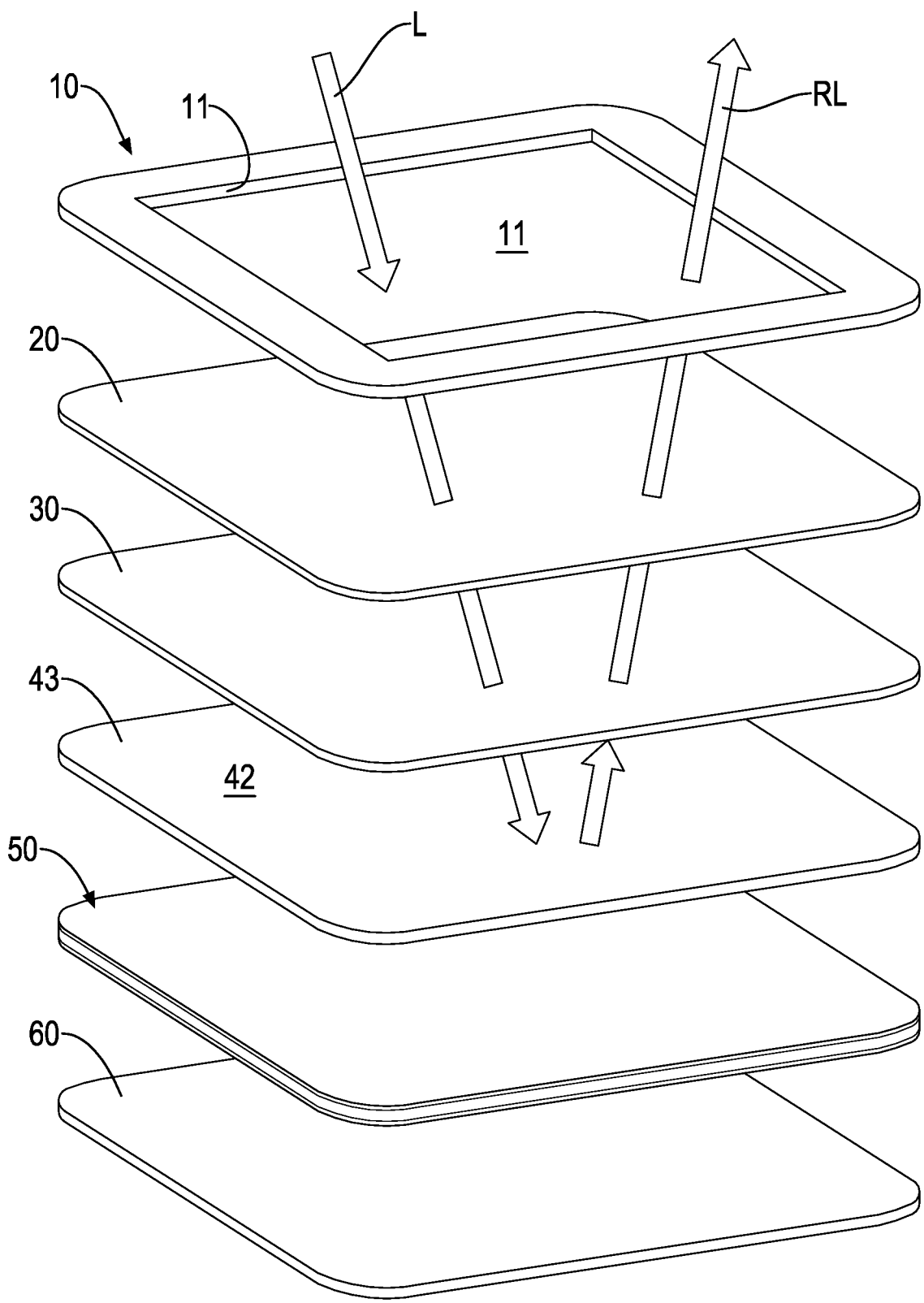
FIG. 7 is an exploded perspective view of the second embodiment of the present invention.

Please refer to FIGS. 6-7. FIGS. 6-7 are about a second embodiment of the unitarily white light-transmitting device and touch display of the present invention. The differences between the second embodiment and the embodiment shown in FIGS. 1-2 are that: in the second embodiment, a multilayer transflective optical film 43 replaces the microstructure optical film 40, and an air gap 42 is further sandwiched between the light valve module 30 and the multilayer transflective optical film 43. The air gap 42 has a thickness d which is a design parameter.

Figure 8:
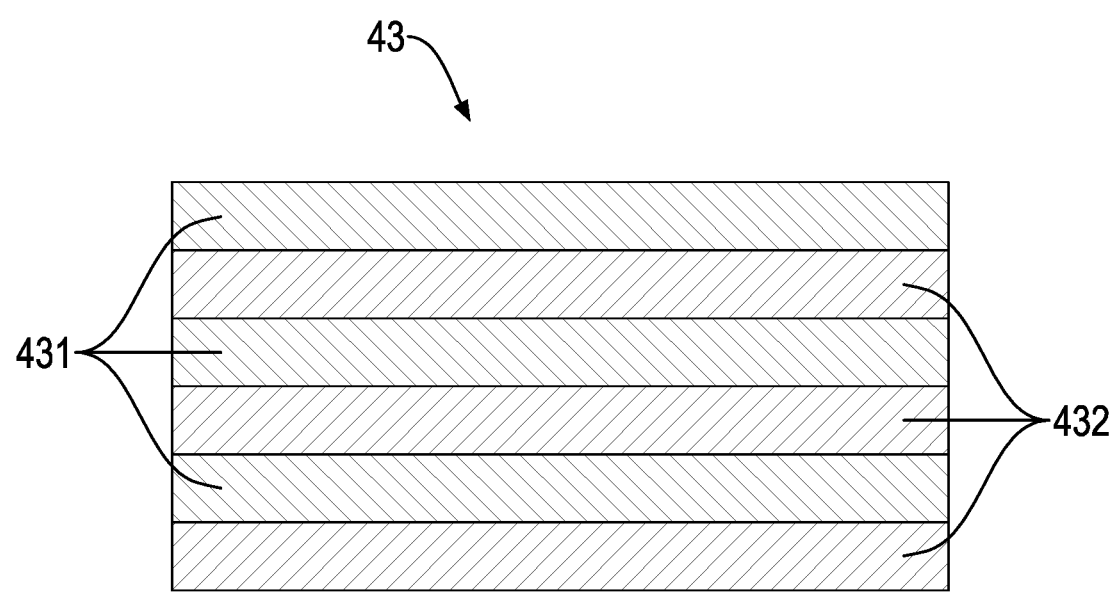
FIG. 8 is a cross-sectional side view of a multilayer transflective optical film of the second embodiment.

Please refer to FIG. 8. FIG. 8 shows a plurality of film layers of the multilayer transflective optical film 43, wherein the multilayer transflective optical film 43 is composed of a plurality of birefringent films 431 and a plurality of optically isotropic films 432 which are alternately stacked, wherein the plurality of birefringent films 431 have two refractive indices $n_o$ and $n_e$, and the plurality of optically isotropic films 432 have a single refractive index $n_i$.

Figure 9:
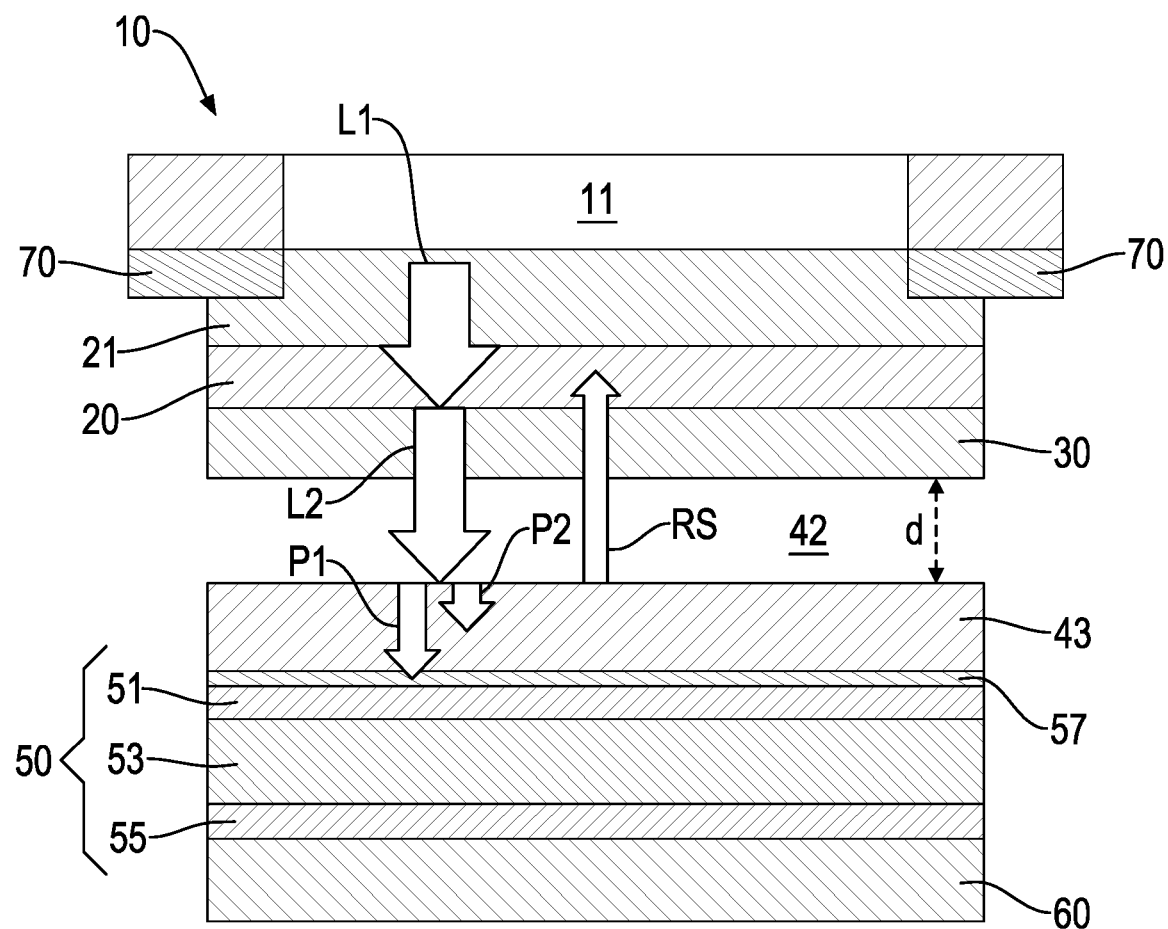
FIG. 9 shows working principles of the multilayer transflective optical film of the second embodiment.

Please refer to FIG. 9. FIG. 9 shows how the multilayer transflective optical film 43 works. When an unpolarized white light passes through the multilayer transflective optical film 43, the unpolarized white light is split into a polarized light P1 parallel to the incident plane and a polarized light P2 perpendicular to the incident plane. The polarized light P1 penetrates the multilayer transflective optical film 43, and the polarized light P2 is reflected by the multilayer transflective optical film 43 to become a polarized light RS. In this embodiment, because the light valve module 30 enters the light scattering mode when the power is turned off, about 70% of the incident light can penetrate the light valve module 30 at this moment, and about 30% of the incident light is reflected by the light valve module 30. Therefore, an incident unpolarized white light L1 from the ambient can pass through the light valve module 30 to form an incident unpolarized white light L2. The incident unpolarized white light L2 is split into a polarized light P1 parallel to the incident plane and a polarized light P2 perpendicular to the incident plane by the multilayer transflective optical film 43. The polarized light P1 penetrates the multilayer transflective optical film 43, and the polarized light P2 is reflected by the multilayer transflective optical film 43 as a polarized light RS, and the polarized light RS passes through the light valve module 30, so that the user can perceive the viewing area 11 in foggy white.

Please refer to FIGS. 6-7 again. When there is no air gap between the light valve module 30 and the multilayer transflective optical film 43, ambient light passing through a boundary between the light valve module 30 and the multilayer transflective optical film 43 does not generate scattered light; hence, a user may directly perceive the surface color of the multilayer transflective optical film 43. When the thickness d of the air gap 42 is not zero, an air gap is between the light valve module 30 and the multilayer transflective optical film 43, and then, scattering and multiple reflections can occur for ambient light passing through the light valve module 30 and the air gap 42, which may increase the proportionality of incident light being reflected by the multilayer transflective optical film 43 to re-penetrate the light valve module 30, so that the user can observe, in the viewing area 11, the surface of the display in denser foggy white.

Since a touch module 20 is to be assembled, the thickness d of the air gap needs to be greater than 0.4 mm. However, the greater the thickness of the air gap, the greater the light scattering and multiple reflection, and that will affect the contrast of the display, making the luminance of a black screen increase and deviate from a pure black screen, resulting in a decrease in contrast, as shown in Table I.

Table I lists the measured black screen luminance, white screen luminance and contrast, with respect to various air gap thicknesses d for the touch display of the present embodiment.

TABLE I

| | White screen luminance | Black screen luminance | Contrast |
|---|---|---|---|
| Ordinary display no air gap | 337.6 | 0.3389 | 996.16 |
| Air gap d is 0.4 mm | 310.8 | 0.3412 | 910.90 |
| Air gap d is 0.5 mm | 302.3 | 0.3681 | 821.24 |
| Air gap d is 0.7 mm | 250.7 | 0.7289 | 343.94 |
| Air gap d is 6.0 mm | 230.1 | 1.989 | 115.69 |

Table II lists the measured colors of the display viewing area 11 with respect to various hazes of the light valve module 30 in the present embodiment. Table II also lists the designated color and the designated perceptual color difference of the white inked frame area of the frame 70. Table II also lists the relative perceptual differences (ΔE) between the designated color of the white inked frame area of the frame 70 and the various measured colors of the display viewing area 11. Note that the relative perceptual differences (ΔE) between any two colors in L*a*b* color system (1976) can be approximated by taking the Euclidean distance between them. The relative perceptual differences (ΔE) between any two colors is instead called "color difference" hereinafter for brevity.

When a haze of the light valve module 30 is higher, the light scattering is greater, so that the color of the viewing area 11 of the display will be closer to the designated color of the white inked frame area of the frame 70. It can be seen from Table II that when the haze is greater than 85, the color difference (ΔE) is 2.80, less than the designated color difference (ΔE) of 3.0, and that is acceptable.

TABLE II

| CIELAB | Designated L* | Designated a* | Designated b* | Designated ΔE |
|---|---|---|---|---|
| Designated color & color difference | 65.92 | −1.12 | −0.14 | <3.0 |

| Haze controlled by PDLC | Measured L* | Measured a* | Measured b* | Calculated ΔE |
|---|---|---|---|---|
| 85.10 | 64.50 | −0.10 | 2.05 | 2.80 |
| 13.50 | 64.51 | −0.01 | 2.40 | 3.10 |
| 6.10 | 72.22 | −0.78 | 1.54 | 6.53 |
| 4.50 | 72.31 | −0.39 | 0.35 | 6.45 |
| 2.90 | 72.35 | −0.20 | 0.65 | 6.55 |
| 2.00 | 72.94 | −0.19 | 0.95 | 7.16 |

Figure 10:
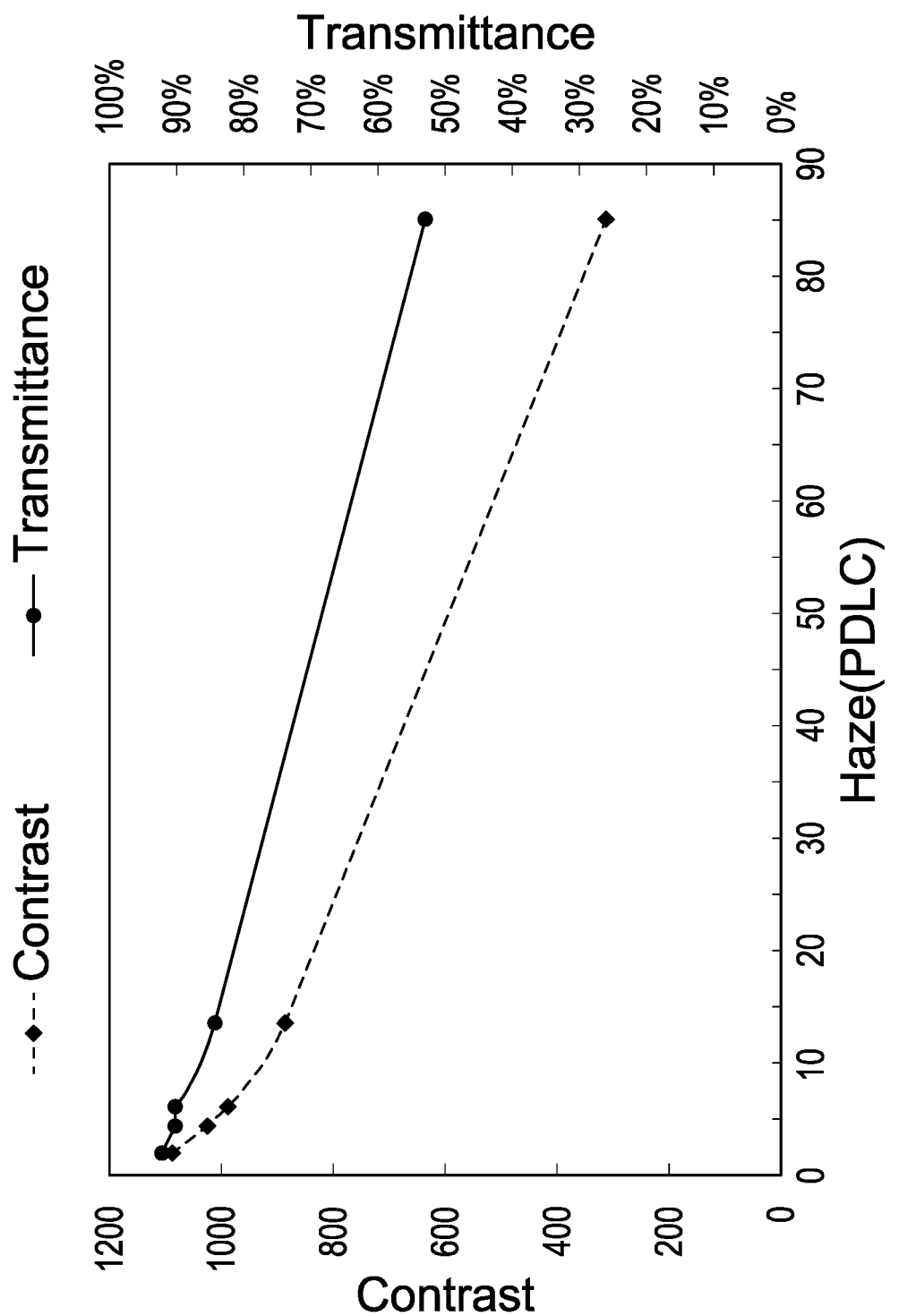
FIG. 10 shows measurement results of the second embodiment.

Please refer to FIG. 10. FIG. 10 shows the contrast of the display and the measured value of the light transmittance of the light valve module 30 with respect to various hazes of the light valve module 30 in the second embodiment of the present invention when the thickness d of the air gap 42 is 0.5 mm. It can be seen from FIG. 9 that when the haze of the light valve module 30 is larger, the contrast of the display is smaller. When the haze of the light valve module 30 is less than 10, the contrast of the display is greater than 950; and when the haze of the light valve module 30 is greater than 85, the contrast of the display is less than 350. When the haze of the light valve module 30 is larger, the light transmittance of the light valve module 30 is smaller.

The aforementioned are preferred embodiments of the present invention. It should be noted that for those of ordinary skill in the art, without departing from the principles of the present invention, certain improvements and retouches of the present invention can still be made, which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A unitarily white touch display, including:
a cover lens, having an upper surface, a lower surface, and a viewing area formed in the middle of the cover lens;
a touch module, disposed on the lower surface of the cover lens for providing touch functions;
a light valve module, disposed under the touch module, including:
a casing, filled with a polymer dispersed liquid crystal (PDLC) layer which is driven by an electric field to form a scattering mode and a transparent mode;
a conductive film, disposed inside the casing and configured to be charged to generate the electric field;
a microstructure optical film, disposed under the light valve module and including a first surface and a second surface opposite to each other, the first surface attached to the light valve module and the second surface composed of a plurality of micro-prisms, wherein, in a cross-sectional view, each micro-prism is in a shape of a triangular micro structure;
a display module, disposed under the microstructure optical film to provide a display function;
wherein, incident light passing through the light valve module, then entering the microstructure optical film, is reflected by the microstructure optical film back to the light valve module.

2. The unitarily white touch display as claimed in claim 1, wherein the PDLC layer comprises a polymer and an anisotropic liquid crystal, and the anisotropic liquid crystal is encapsulated by the polymer.

3. The unitarily white touch display as claimed in claim 2, wherein each micro-prism includes two reflecting surfaces joining at an angle of 90°; the two reflecting surfaces are formed on the second surface, and the two reflecting surfaces and the second surface together form a triangular micro structure.

4. The unitarily white touch display as claimed in claim 3, wherein the display module includes:
an upper polarizer film disposed under the microstructure optical film;
a display disposed under the upper polarizer film; and
a lower polarizer film disposed under the display, and the display being sandwiched between the upper polarizer film and the lower polarizer film.

5. The unitarily white touch display as claimed in claim 4, wherein the unitarily white touch display further includes a frame disposed between the cover lens and the touch module.

6. The unitarily white touch display as claimed in claim 5, wherein the display is a liquid crystal display.

7. The unitarily white touch display as claimed in claim 6, the unitarily white touch display further including a backlight module disposed under the liquid crystal display module to provide backlight.

8. The unitarily white touch display as claimed in claim 5, wherein the display is a light emitting diode display.

9. A unitarily white touch display, including:
a cover lens, having an upper surface, a lower surface, and a viewing area formed in the middle of the cover lens;
a touch module, disposed on the lower surface of the cover lens for providing touch functions;
a light valve module, disposed under the touch module, including:
a casing, filled with a polymer dispersed liquid crystal (PDLC) layer which is driven by an electric field to form a scattering mode and a transparent mode;
a conductive film, disposed inside the casing and configured to be charged to generate the electric field;
an air gap, located under the light valve module;
a multilayer transflective optical film, disposed under the air gap, the multilayer transflective optical film including a plurality of birefringent films and optically isotropic films;
a display module, disposed under the microstructure optical film to provide display functions;
wherein, incident light passing through the light valve module, the air gap, then entering the multilayer transflective optical film, is partially reflected by the multilayer transflective optical film back to the light valve module through the air gap; and scattering of the incident light occurs in the air gap.

10. The unitarily white touch display as claimed in claim 9, wherein
the PDLC layer includes a polymer and an anisotropic liquid crystal, and the anisotropic liquid crystal is encapsulated by the polymer.

11. The unitarily white touch display as claimed in claim 9, wherein the plurality of birefringent films and optically isotropic films of the multilayer transflective optical film are alternately stacked.

12. The unitarily white touch display as claimed in claim 9, wherein the display module includes:
   an upper polarizer film disposed under the multilayer transflective optical film;
   a display disposed under the upper polarizer film; and
   a lower polarizer film disposed under the display, and the display being sandwiched between the upper polarizer film and the lower polarizer film.

13. The unitarily white touch display as claimed in claim 9, wherein the unitarily white touch display further includes a frame disposed between the cover lens and the touch module.

14. A unitarily white light-transmitting device, including:
   a light valve module, including:
      a casing, filled with a polymer dispersed liquid crystal (PDLC) layer which is driven by an electric field to form a scattering mode and a transparent mode;
      a conductive film, disposed inside the casing and configured to be charged to generate the electric field;
   an air gap, located under the light valve module;
   a multilayer transflective optical film, configured under the air gap, the multilayer transflective optical film including a plurality of birefringent films and optically isotropic films;
   wherein, incident light passing through the light valve module, the air gap, then entering the multilayer transflective optical film, is partially reflected by the multilayer transflective optical film back to the light valve module through the air gap; and scattering of the incident light occurs in the air gap.

15. The unitarily white light-transmitting device as claimed in claim 14, wherein the PDLC layer includes a polymer and an anisotropic liquid crystal, and the anisotropic liquid crystal is encapsulated by the polymer.

16. The unitarily white light-transmitting device as claimed in claim 14, wherein the plurality of birefringent films and optically isotropic films of the multilayer transflective optical film are alternately stacked.

* * * * *